United States Patent
Matsumoto

(10) Patent No.: US 6,879,892 B2
(45) Date of Patent: Apr. 12, 2005

(54) ELECTRONIC CONTROL SYSTEM AND METHOD THEREOF

(75) Inventor: Satoru Matsumoto, Brussels (BE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 7 days.

(21) Appl. No.: 10/330,222

(22) Filed: Dec. 30, 2002

(65) Prior Publication Data

US 2003/0135309 A1 Jul. 17, 2003

(30) Foreign Application Priority Data

Jan. 11, 2002 (JP) .......................... 2002-005203

(51) Int. Cl.$^7$ .......................... G04F 10/04; B60R 16/02
(52) U.S. Cl. .............................. 701/29; 701/1; 701/31; 701/113; 307/10.1
(58) Field of Search ................................ 701/1, 29, 31, 701/34, 101, 112, 113, 114; 307/10.1, 10.6; 123/198 D, 198 DB, 179.21

(56) References Cited

U.S. PATENT DOCUMENTS

| | | | | |
|---|---|---|---|---|
| 4,088,110 A | * | 5/1978 | Sperline | 123/198 DB |
| 4,542,718 A | * | 9/1985 | Hurner | 123/41.15 |
| 4,648,364 A | * | 3/1987 | Wills | 123/198 D |
| 5,482,013 A | * | 1/1996 | Andrews et al. | 123/179.21 |
| 5,633,537 A | * | 5/1997 | Kurata et al. | 307/10.6 |
| 5,834,854 A | * | 11/1998 | Williams | 307/10.6 |
| 6,055,470 A | * | 4/2000 | Londot et al. | 701/35 |
| 6,347,276 B1 | * | 2/2002 | Avery, Jr. | 701/112 |
| 6,437,460 B1 | * | 8/2002 | Theofanopoulos et al. | 307/10.1 |

FOREIGN PATENT DOCUMENTS

| | | | |
|---|---|---|---|
| JP | A 2000-329874 | | 11/2000 |
| JP | 2000329874 | * | 11/2000 |

\* cited by examiner

*Primary Examiner*—Tan Q. Nguyen
(74) *Attorney, Agent, or Firm*—Oliff & Berridge, PLC

(57) ABSTRACT

A timer IC is operated by power supplied from a standby power source so as to output a start-up signal for starting a microcomputer every time that the time period during which a non-operating state of the microcomputer continues reaches a predetermined value. When the start-up signal is supplied to a relay coil of a main relay from the timer IC, it enables power to be supplied to the microcomputer from an in-vehicle battery. When it is determined that the microcomputer is started by the timer IC, a part of a series of predetermined initial process steps is executed and process steps relating only to the failure diagnosis are executed. That is, in the above condition, execution of the control for turning on an engine check lamp and a monitor can be inhibited by interrupting output of signals to the microcomputer.

19 Claims, 1 Drawing Sheet

ELECTRONIC CONTROL SYSTEM AND METHOD THEREOF

INCORPORATION BY REFERENCE

The disclosure of Japanese Patent Application No. 2002-005203 filed on Jan. 11, 2002 including the specification, drawing and abstract is incorporated herein by reference in its entirety.

BACKGROUND OF THE INVENTION

1. Field of Invention

The invention relates to an electronic control system, and especially to an electronic control system mounted on a vehicle, such as a motor vehicle, and used for detecting failures of various components of the vehicle.

2. Description of Related Art

It is well known that an electronic control system is used for controlling a variety of components of a vehicle such as a motor vehicle. The aforementioned vehicle includes the electronic control system that diagnoses failure of its own components as well as various components of the vehicle. For example, a known failure diagnosis of this kind, such as that performed by an electronic control system disclosed in Japanese Laid-open Patent Publication No. 2000-329874, is performed while an internal combustion engine of the vehicle is not operating, that is, the vehicle is in a stable state, such that accuracy of the diagnosis is improved. The electronic control system disclosed in the above publication includes a clock system that is supplied with power, not via an ignition switch, but directly from a power supply. The clock system is adapted to count the time for which the ignition switch has been OFF while the vehicle is not operating, and turn on a power supply circuit to supply power to and thereby start up the electronic control system when the counted time has reached a predetermined time.

According to the electronic control system disclosed in the above publication, however, when the electronic control unit has been started, a series of predetermined initial processes and various control process steps, such as the fuel injection control, are all performed based on the detection signals from the sensors, irrespective of whether the unit has been started by operating the ignition switch or by the clock system. The initial process steps include the turn-on controls for turning on engine-check lamps and monitors and so on. In this way, even when the electronic control unit has been started by the clock system, the same process steps as those performed when the unit has been started by operating the ignition switch are performed. That is, the series of predetermined initial process steps are all performed when the unit has been started by the clock system, in spite of the fact that it is only necessary at this time to operate the components related to the failure diagnosis. The power consumption increases, thus reducing the life of the in-vehicle battery.

SUMMARY OF THE INVENTION

Accordingly, the invention thus provides an electronic control system that achieves reduced power consumption by reducing the wasteful use of power when the electronic control unit has been started in a non-operating state of the electronic control unit.

According to an exemplary embodiment of the invention, an electronic control system is provided with an electronic control unit that starts and stops in accordance with a state of a power supply from a primary power source, and executes a plurality of predetermined process steps in an operating state, a first start-up device that outputs a start-up signal for starting up the electronic control unit, a second start-up device that is operated at least in a non-operating state of the electronic control unit, and outputs a start-up signal for starting up the electronic control unit when a predetermined condition has been established, and a power supply device that supplies power to the electronic control unit in response to the start-up signal of one of the first and the second start-up devices so as to operate the electronic control unit. Execution of at least one of the plurality of predetermined process steps performed by the electronic control unit is inhibited when the electronic control unit is started on the basis of the start-up signal of the second start-up device.

With this arrangement, when the electronic control unit has been started by the start-up signal from the second start-up device, execution of at least one of the plurality of predetermined process steps performed by the electronic control unit is inhibited. The wasteful use of power, thus, can be decreased to achieve reduced power consumption.

In the exemplary embodiment of the invention, the electronic control unit serves to control and diagnose a plurality of components of a vehicle. The first start-up device is an ignition switch for starting up an internal combustion engine of the vehicle, and the primary power source is a battery mounted on the vehicle.

With this arrangement, when the electronic control unit has been started by the start-up signal from the second start-up device, performing at least one process step among the plurality of predetermined process steps performed by the electronic control unit is inhibited. The wasteful use of power, thus, can be reduced to achieve reduced power consumption, thereby saving the life of the in-vehicle battery.

In the exemplary embodiment of the invention, the second start-up device is a timer unit that operates on the basis of a secondary power source when the electronic control unit is in one of an operating state and a non-operating state, counts a time for which the non-operating state of the electronic control unit continues, and outputs a start-up signal for starting up the electronic control unit every time when the counted time reaches a predetermined value.

This arrangement may allow start-up of the electronic control unit to perform only the desired process among the plurality of predetermined processes every time when the time counted by the timer reaches a predetermined value.

BRIEF DESCRIPTION OF THE DRAWINGS

The foregoing and further objects, features and advantages of the invention will become more apparent from the following description of preferred exemplary embodiments with reference to the accompanying drawing wherein.

DETAILED DESCRIPTION OF PREFERRED EMBODIMENTS

Figure 1:
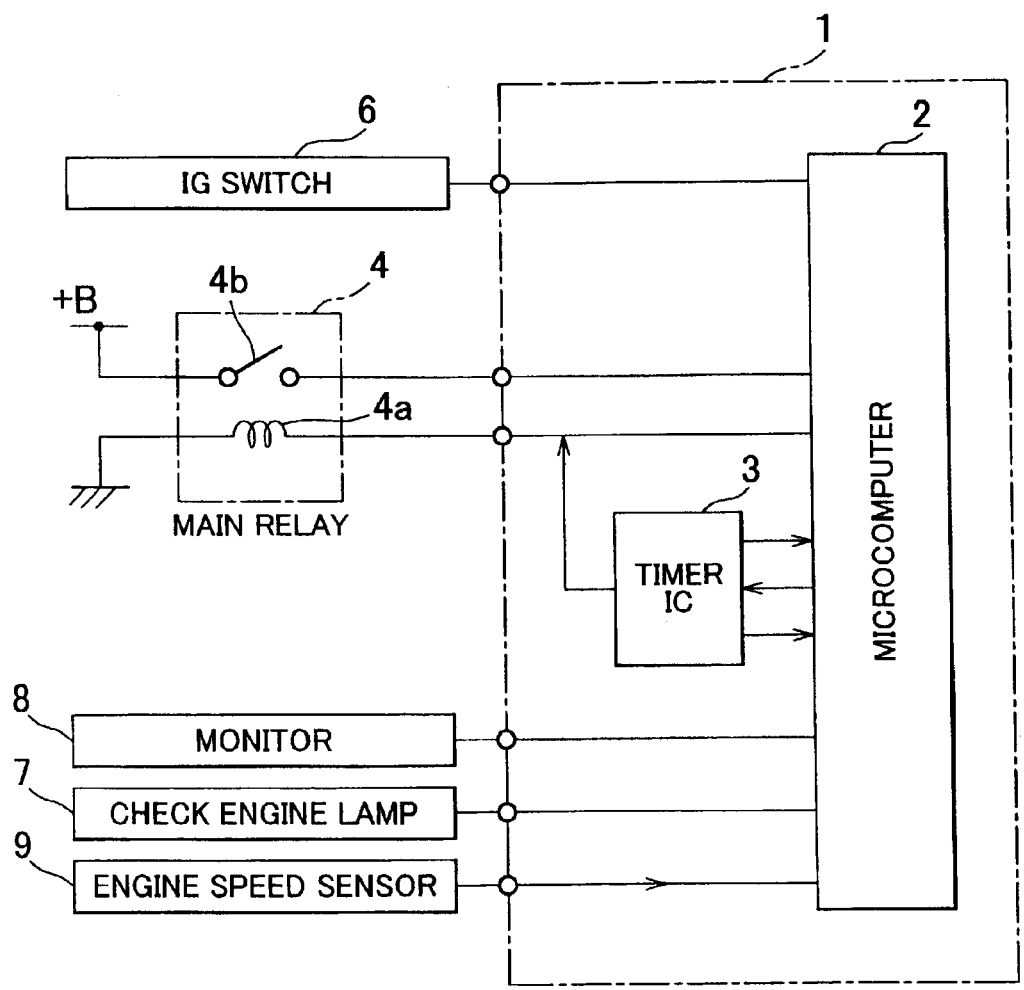
FIG. 1 is a block diagram schematically showing the configuration of an electronic control system according to one exemplary embodiment of the invention, to be mounted on a vehicle.

Hereinafter, an electronic control system according to one exemplary embodiment of the invention, which is mounted on a vehicle, will be described in detail with reference to the accompanying figure.

FIG. 1 schematically shows the construction of an electronic control system according to the exemplary embodiment, which is mounted on a vehicle. The electronic control system includes a microcomputer 2, a timer IC 3 serving as a second start-up device and a main relay 4 serving as a primary power supply.

The timer IC 3 is supplied with power from a standby power supply as a secondary power supply so as to be operated irrespective of whether the microcomputer 2 is operating. The timer IC 3, in operation, continuously counts the time for which the microcomputer 2 is not operating, and outputs a start-up signal for starting up the microcomputer 2 to the main relay 4 and the microcomputer 2, every time when the counted time has reached the predetermined time.

An ignition switch 6 that generates the start-up signal for starting up the microcomputer 2 is connected to the microcomputer 2. Also, an in-vehicle battery B is connected to the microcomputer 2 through the main relay 4. The microcomputer 2 is arranged to output a start-up signal to the main relay 4 when the ignition switch 6 has been turned on.

When the start-up signal generated by operating the ignition switch 6 or generated by the timer IC 3 is supplied to a relay coil 4a of the main relay 4, a relay switch 4b is turned on to enable supply of power from the battery B to the microcomputer 2.

The microcomputer 2 has a known construction including a CPU, a ROM, a RAM, an input/output circuit and a backup RAM. When the microcomputer 2 has been started by turning the ignition switch 6 and using power supplied from the battery B, the series of predetermined initial processes, as well as controls like the fuel injection control of the engine and the ignition timing control, are performed. As the initial processes, for example, the turn-on controls for turning on engine-check lamps 7 and monitors 8 which are connected to the microcomputer 2, are performed based on the detection signals from the sensors.

Meanwhile, when the microcomputer 2 has been started by the start-up signal from the timer IC 3 using power supplied from the battery B, the microcomputer 2 determines that it has been started by the timer IC, and thus performs only one or some of the series of predetermined processes and the process(es) related to the failure diagnosis of the components. Namely, the turn-on controls for turning on the engine-check lamps 7 and the monitors 8 are not performed by sending no output signals thereto in the initial processes. When the microcomputer 2 is started by the timer IC 3, input of signals form an engine speed sensor 9 is interrupted such that the fuel injection control of the engine, the ignition timing control and so on are inhibited.

When the microcomputer 2 started by the start-up signal from the timer IC 3 has finished the diagnostic procedure, the microcomputer 2 stops its operation by interrupting an output of the start-up signal to the relay coil 4a so as to stop the power supply from the battery B. At this moment, the microcomputer 2 outputs a reset signal to the timer IC3 such that the counted time is reset.

According to the exemplary embodiment, when the microcomputer 2 is started by the start-up signal from the timer IC 3, execution of at least one of the plurality of predetermined process steps is inhibited. This makes it possible to decrease power consumption by reducing the wasteful use of power.

According the exemplary embodiment, the invention is applied to the electronic control unit 1 for a vehicle. Therefore, upon start-up of the microcomputer 2 by the timer IC 3, the power consumption can be decreased by reducing the wasteful use of power. Accordingly, the life of the battery B, thus, can be saved.

According to the exemplary embodiment, the microcomputer 2 can be started to perform the desired process(es) related to the failure diagnosis and the like, among the plurality of predetermined process steps every time when the time counted by the timer IC 3 reaches the predetermined time.

The exemplary embodiment may be modified by, in place of the timer IC 3, providing a circuit that outputs a start-up signal for starting up the microcomputer 2 upon receipt of an external start-up request signal.

The exemplary embodiment may also be modified by providing a circuit between the microcomputer 2, and the engine check lamp 7 and the monitor 8 such that the output of the microcomputer 2 is interrupted on the basis of the start-up signal of the timer IC3.

The invention is applied to the electronic control unit 1 mounted on the vehicle. However, the invention may be applied to a normally used computer and a microcomputer provided with a standby power supply.

In a modified exemplary embodiment of the invention, the second start-up device may be a communication unit that operates on the basis of a secondary power source when the electronic control unit is in one of an operating state and a non-operating state, and outputs a start-up signal for starting up the electronic control unit upon receipt of an external start-up request signal.

A modified exemplary embodiment of the invention may be provided with a circuit connected to the electronic control unit, which cuts off an output of the electronic control unit in response to the start-up signal of the second start-up device.

The ECU 1 of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An electronic control system, comprising:
   an electronic control unit that starts and stops in accordance with a state of a power supply from a primary power source, and executes a plurality of predetermined process steps in an operating state;
   a first start-up device that outputs a start-up signal for starting up the electronic control unit;
   a second start-up device that is operated at least in a non-operating state of the electronic control unit, and outputs the start-up signal for starting up the electronic control unit when a predetermined condition has been established; and
   a power supply device that supplies power to the electronic control unit in response to the start-up signal of one of the first and the second start-up devices so as to operate the electronic control unit, wherein execution of at least one of the plurality of predetermined process steps that are directly performed by the electronic control unit is inhibited when the electronic control unit is started on the basis of the start-up signal of the second start-up device.

2. The electronic control system according to claim 1, wherein the electronic control unit serves to control and diagnose a plurality of components of a vehicle, the first start-up device comprises an ignition switch for starting up an internal combustion engine of the vehicle, and the primary power source comprises a battery mounted to the vehicle.

3. The electronic control system according to claim 2, wherein execution of a control for turning on at least one of a lamp and a monitor of the vehicle is inhibited when the electronic control unit is started on the basis of the start-up signal of the second start-up device.

4. The electronic control system according to claim 2, wherein the second start-up device comprises a timer unit that operates on the basis of a secondary power source when the electronic control unit is in one of an operating state and a non-operating state, counts a time for which the non-operating state of the electronic control unit continues, and outputs a start-up signal for starting up the electronic control unit every time that the counted time reaches a predetermined value.

5. The electronic control system according to claim 4, further comprising a circuit connected to the electronic control unit, the circuit serving to cut off an output of the electronic control unit in response to the start-up signal of the second start-up device.

6. The electronic control system according to claim 2, wherein the second start-up device comprises a communication unit that operates on the basis of a secondary power source when the electronic control unit is in one of an operating state and a non-operating state, and outputs a start-up signal for starting up the electronic control unit upon receipt of an external start-up request signal.

7. The electronic control system according to claim 6, further comprising a circuit connected to the electronic control unit, the circuit serving to cut off an output of the electronic control unit in response to the start-up signal of the second start-up device.

8. The electronic control system according to claim 2, further comprising a circuit connected to the electronic control unit, the circuit serving to cut off an output of the electronic control unit in response to the start-up signal of the second start-up device.

9. The electronic control system according to claim 1, wherein the second start-up device comprises a timer unit that operates on the basis of a secondary power source when the electronic control unit is in one of an operating state and a non-operating state, counts a time for which the non-operating state of the electronic control unit continues, and outputs a start-up signal for starting up the electronic control unit every time that the counted time reaches a predetermined value.

10. The electronic control system according to claim 9, further comprising a circuit connected to the electronic control unit, the circuit serving to cut off an output of the electronic control unit in response to the start-up signal of the second start-up device.

11. The electronic control system according to claim 1, wherein the second start-up device comprises a communication unit that operates on the basis of a secondary power source when the electronic control unit is in one of an operating state and a non-operating state, and outputs a start-up signal for starting up the electronic control unit upon receipt of an external start-up request signal.

12. The electronic control system according to claim 11, further comprising a circuit connected to the electronic control unit, the circuit serving to cut off an output of the electronic control unit in response to the start-up signal of the second start-up device.

13. The electronic control system according to claim 1, further comprising a circuit connected to the electronic control unit, the circuit serving to cut off an output of the electronic control unit in response to the start-up signal of the second start-up device.

14. A method of controlling an electronic control system including an electronic control unit that starts and stops in accordance with a state of power supply from a primary power source, and executes a plurality of predetermined process steps in an operating state, a first start-up device that outputs a start-up signal for starting up the electronic control unit, a second start-up device that is operated at least in a non-operating state of the electronic control unit, and outputs the start-up signal for starting up the electronic control unit when a predetermined condition has been established, and a power supply device that supplies power to the electronic control unit in response to the start-up signal of one of the first and the second start-up devices so as to operate the electronic control unit, the method comprising:

inhibiting execution of at least one of the plurality of predetermined process steps that are directly performed by the electronic control unit upon start-up of the electronic control unit on the basis of the start-up signal of the second start-up device.

15. The method according to claim 14, wherein a plurality of components of a vehicle are controlled and diagnosed by the electronic control unit, an ignition switch unit used for starting up an internal combustion engine of the vehicle is the first start-up device, and a battery mounted on the vehicle is the primary power source.

16. The method according to claim 15, wherein the inhibiting step includes inhibiting execution of a control for turning on at least one of a lamp and a monitor of the vehicle when the electronic control unit is started on the basis of the start-up signal of the second start-up device.

17. The method according to claim 14, wherein the second start-up device operates on the basis of a secondary power source when the electronic control unit is in one of an operating state and a non-operating state, counts a time for which the non-operating state of the electronic control unit continues, and outputs a start-up signal for starting up the electronic control unit every time that the counted time reaches a predetermined value.

18. The method according to claim 14, wherein the second start-up device operates on the basis of a secondary power source when the electronic control unit is in one of an operating state and a non-operating state, and outputs a start-up signal for starting up the electronic control unit upon receipt of an external start-up request signal.

19. The method according to claim 14, wherein a circuit serves to cut off an output of the electronic control unit in response to the start-up signal of the second start-up device.

* * * * *